United States Patent [19]

Schoening et al.

[11] 4,349,507

[45] Sep. 14, 1982

[54] DRIVE FOR AN ABSORBER ROD OF A NUCLEAR REACTOR

[75] Inventors: Josef Schoening, Hambruecken; Claus Elter, Bad Durkheim; Hermann Schmitt, Langmeil, all of Fed. Rep. of Germany

[73] Assignee: Hochtemperatur-Reaktorbau GmbH., Cologne, Fed. Rep. of Germany

[21] Appl. No.: 159,862

[22] Filed: Jun. 16, 1980

[30] Foreign Application Priority Data

Jun. 16, 1980 [DE] Fed. Rep. of Germany ....... 2927628

[51] Int. Cl.³ .............................................. G21C 7/16
[52] U.S. Cl. .................................. 376/230; 376/225; 376/243
[58] Field of Search ............. 176/36 R; 376/230, 243, 376/225

[56] References Cited

U.S. PATENT DOCUMENTS

| | | | |
|---|---|---|---|
| 3,324,006 | 6/1967 | Challender et al. | 176/36 R |
| 3,627,632 | 12/1971 | Acher et al. | 176/36 R |
| 3,728,219 | 4/1973 | Mattern et al. | 176/36 R |
| 3,775,247 | 12/1973 | Ode et al. | 176/36 R |
| 3,957,577 | 5/1976 | Treshow | 176/36 R |
| 3,979,258 | 9/1976 | Schweiger et al. | 176/36 R |
| 4,090,917 | 5/1978 | Jabsen | 176/36 R |
| 4,158,602 | 6/1979 | Minnick | 176/36 R |
| 4,164,443 | 8/1979 | Gibbons et al. | 176/36 R |
| 4,187,145 | 2/1980 | Noyes et al. | 176/36 R |

Primary Examiner—Sal Cangialosi
Attorney, Agent, or Firm—Schwartz, Jeffery, Schwaab, Mack, Blumenthal & Koch

[57] ABSTRACT

The drive for an absorber rod for a nuclear reactor has a drive piston guided in a cylinder combined with the absorber rod forming an absorber unit. In order to compensate the forces exerted by the medium of the pressure vessel on the absorber unit and tending to pressure the absorber rod axially outward, an equalizing surface is arranged in the absorber unit. The equalizing surface is exposed on one side to the medium of the pressure vessel and/or the cooling medium of the absorber rod, so that an equalizing force is acting on the absorber unit. In the event of a failure of the drive medium acting on the drive piston of the absorber unit or during fluctuations and changes of the internal pressure in the pressure vessel, the absorber unit remains in its existing position, i.e. no unintentional withdrawal of the absorber rod from the pressure vessel takes place.

12 Claims, 4 Drawing Figures

DRIVE FOR AN ABSORBER ROD OF A NUCLEAR REACTOR

BACKGROUND OF THE INVENTION

1. Field of the Invention

The present invention relates to a drive arrangement for an absorber rod of a nuclear reactor. More particularly, the invention concerns an absorber unit comprising an absorber rod, an absorber rod drive and at least one drive cylinder accessible to a fluid drive medium. The absorber rod is arranged in the pressure vessel of the nuclear reactor and is preferably cooled by the reactor cooling system.

2. Background of the Prior Art

In the known drives of this type serving for the insertion and extraction of absorber rods into the core area of a nuclear reactor, the drive piston must be exposed constantly to the driving medium in order to maintain the absorber rod against the over-pressure prevailing in the pressure vessel in the completely inserted or partially inserted state. This presents undesirable difficulties for control of the absorber rod, for example, in the event of a drop in the pressure of the driving medium (occurring as the result of the leakage of supply lines or as the result of changes in the internal pressure prevailing in the pressure vessel) the absorber rod will be driven into a retracted position and quite possibly out of the pressure vessel itself.

It is, therefore, an object of the invention to provide a drive arrangement of the above-mentioned type in a simple and cost-effective manner whereby the absorber rod is maintained in its position in case of a drop in or failure of the pressure of the driving medium or during variations of the internal pressure of the pressure vessel.

This object is attained according to the invention with a drive of the above-mentioned type also including an absorber unit comprising an absorber rod, an absorber rod drive and at least one drive cylinder. The absorber unit is equipped with at least one equalizing surface extending transversely to the longitudinal axis of the absorber rod. The equalizing surface faces the direction opposite the first surface penetrating the reactor and is constructed of material capable of withstanding exposure to the medium contained in the pressure vessel and/or the cooling medium of the absorber rod. The size and arrangement of the equalizing surface is chosen so that the equalizing force applied to the equalizing surface by the medium or cooling medium, respectively, at least substantially compensates the force acting from the medium of the pressure vessel on the absorber rod in the outward, axial direction.

The arrangement of such an equalizing surface accessible to the medium of the pressure vessel or the cooling medium of the absorber rod applies an equalizing force to the absorber unit. That is, the equalizing force effectively neutralizes the opposing force exerted by the medium of the pressure vessel on the absorber rod which acts to drive the rod from the pressure vessel. The size of the equalizing surface is chosen so that the equalizing force may be adapted to the force pressing against the absorber rod. This assures the maintenance of the absorber rod in its existing position in the case of a drop of pressure of the driving medium or in the case of fluctuations of the pressure inside the pressure vessel.

In certain embodiments of the present invention, it is advantageous to generate the equalizing pressure by means of the medium contained in the pressure vessel. It is advantageous in this instance to arrange the equalizing surface on an upper portion of the absorber unit extending axially to the absorber rod. The extension penetrates the cylindrical area surrounding it and terminates in a space contiguous with the inner area of the vessel.

Another, equally advantageous embodiment of the invention consists of arranging the equalizing surface on the outermost end of the drive piston utilized for insertion and extraction of the absorber rod. Again, the cylinder area surrounding the equalizing surface is contiguous with the inner area of the pressure vessel.

In an embodiment employing the use of a hollow, cylindrical absorber rod, the internal space thereof is preferably exposed to a cooling medium and has at least one radial opening for the exit of the cooling medium in its bottom area. It is particularly advantageous to direct the cooling medium into the hollow cylindrical absorber rod making the inside bottom surface of the hollow cylinder the equalizing surface.

In order to equalize or neutralize the forces acting on the absorber unit of this embodiment, it is advisable to render the sum of the equalizing forces and the sum of the surfaces exposed to the axially outward pressure of the medium of the pressure vessel, possibly with the consideration of the weight of the absorber unit, approximately equal.

In this manner, both the dynamic pressure of the flowing cooling medium and the pressure of the medium in the pressure vessel itself act upon the bottom of the hollow cylindrical absorber rod, thus producing the equalizing force desired. Because the flow velocity of the cooling medium and thus the dynamic pressure applied cannot be freely selected, the weight of the absorber unit may be additionally employed in the equalization of the driving force.

Further advantages and characteristics of the invention will be found in the description of examples following hereinbelow and in connection with the schematic drawings.

IN THE DRAWING

Figure 3:
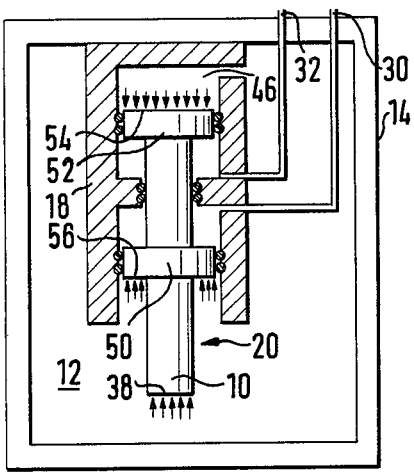

FIG. 3 demonstrates another embodiment of the invention, and

Figure 4:
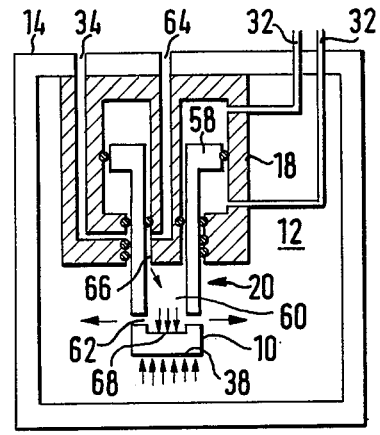

FIG. 4 shows a vertical section through a drive according to the present invention with a hollow, cylindrical absorber rod capable of exposure to a cooling medium.

Similar structural parts in the individual figures are designated by identical reference symbols.

DETAILED DESCRIPTION OF THE PREFERRED EMBODIMENT

Figure 1:
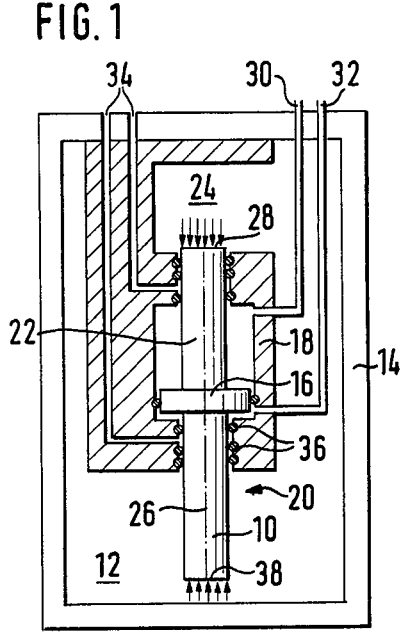
FIG. 1 shows a vertical section through a drive according to the present invention, having an equalizing surface arranged on an upper extension.

FIG. 1 shows an absorber rod 10 protruding into the internal space 12 of the pressure vessel 14 of a nuclear reactor. The upper end of the absorber rod 10 is connected with a drive piston 16 guided in a cylinder 18. The drive piston 16 and the absorber rod 10 constitute the absorber unit 20.

The drive piston 16 has an upwardly directed axial, cylindrical extension 22 with a diameter smaller than the piston surface itself. It penetrates the front wall of the cylinder 18 and terminates in a space 24, which is contiguous with the inner space of the pressure vessel. The terminal surface of the extension 22 arranged transversely, preferably perpendicularly to the longitudinal axis 26 or to the direction of motion of the absorber unit 20, respectively, forms the equalizing surface 28.

In order to accomplish the insertion and retraction of the absorber rod 10, the drive piston 16 is designed for dual action, i.e., the top side of the drive piston may be exposed to a fluid drive medium, for example, hydraulic oil by means of a first control line 30 and the bottom side of the drive piston by means of a second control line 32, so that the vertical motion desired will take place. Auxiliary lines 34 are further provided in the cylinder 18, to drain leakages in the event the sealing gaskets, schematically indicated at 36, do not provide absolute sealing.

In order to insert the absorber rod 10 into its position of maximum absorption, a drive medium is conducted under pressure to the cylinder 18 by way of the first control line 30 so that the drive piston 16, together with the absorber rod 10 connected with it is pressured downward and into this area where absorption can more easily occur. At the same time, the medium present on the opposite side of the drive piston 16 is expelled from the cylinder 18 by way of the second control line 32.

The insertion of the absorber rod 10 and absorber unit 20 respectively is completely unaffected by the internal pressure prevailing in the internal space 12 because the driving force exerted by the internal pressure on the transverse surface 38 of the absorber rod and directed vertically upwards, is compensated by the force applied by the internal pressure on the equalizing surface 28. These forces are nearly equal and act in opposite directions. By correlating the equalizing surface 28 with the surface 38 at the end of the absorber rod, equalization may be rendered complete. This correlation can also take into consideration the weight of the absorber unit 20, acting in the downward direction.

As a direct result of the above-described compensation of the inner pressure of the internal space 12 on the absorber unit 20, force, acting as a driving, a drop in or a failure of the pressure of the drive medium conducted by way of the first control line 30 in the cylinder 18, or a change in the internal pressure in the inner space 12, will initiate no motion of the absorber unit 20. The absorber unit of the vessel 20 will remain in its prevailing position. This arrangement, therefore, compensates the internal forces of the vessel acting to drive the absorber rod into a retracting position by permitting the same forces to act on both sides of the absorber unit.

Figure 2:
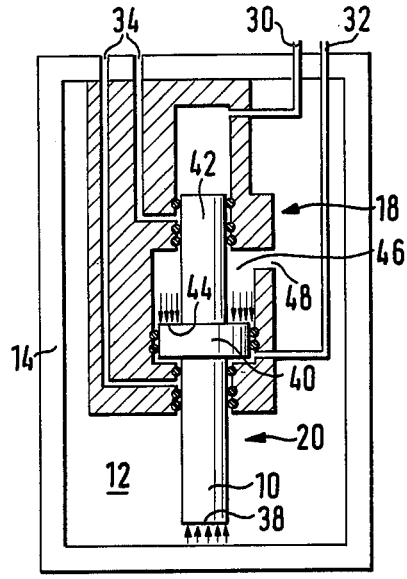
FIG. 2 depicts a variation of the embodiment of FIG. 1 with an equalizing surface arranged on the rear side of the piston.

FIG. 2 represents a variation of the embodiment of FIG. 1. The difference essentially comprises the arrangement of the absorber rod 10 in cooperation with a drive piston 40 and another drive piston 42. The latter drive piston 42 is formed by an upper axial extension of the absorber unit 20. Both drive pistons 40 and 42 have their own working spaces in the cylinder 18 with the drive piston 40 effecting the upward motion, i.e. the retraction of the absorber rod and the drive piston 42 effecting the downward motion, i.e. the insertion of the absorber rod. The equalizing surface 44 is arranged on the outermost side of the drive piston 40. The opposite side of this surface is exposed to the action of a fluid drive medium by way of the control line 32. In order to apply the equalizing forces to the equalizing surface 44, the cylinder space 46 adjacent to the equalizing surface 44 is connected by way of an orifice 48 with the inner space 12 of the pressure vessel 14. To obtain complete compensation of the forces applied by the internal pressure of the pressure vessel on the absorber unit 20, the size of the surface 38 at the end of the absorber rod 10 is correlated with the size of the equalizing surface 44, which is in this case annularly cylindrical. The downward acting weight of the absorber unit 20 is also taken into account in an advantageous variation of this embodiment.

FIG. 2 represents an embodiment of the invention wherein the absorber unit features both the piston 50 provided for the insertion of the absorber rod 10 and the piston 52 effecting the retraction of the absorber rod with larger diameters than the absorber rod 10.

As clearly shown in FIG. 3, the pressure of the internal space 12 acting on the equalizing surface 54 compensates the upward acting drive force applied to the circular surface 38 and the cylindrical annular surface 56.

FIG. 4 shows yet another prefered embodiment of the invention wherein the absorber unit 20 is arranged for internal cooling of the absorber rod. For this purpose, both the absorber rod 10 and the corresponding drive piston 58 have hollow, cylindrical configurations. The internal space 60 of the rod 10 is exposed to a fluid driving medium which exits into the internal space 12 of the pressure vessel 14 by way of radial orifices 62 arranged in the vicinity of the bottom of the absorber rod 10. The cooling medium is supplied by way of a channel 64 provided in the cylinder 18 which is connected by way of a gap 66 between the wall of the piston and the cylinder 18 with the internal space 60.

During operation of this embodiment, the cooling medium flows through the channel 64, the gap 66 and the orifices 62 in the internal space 12 of the pressure vessel 14, whereby the dynamic pressure of the cooling medium acts in addition to the pressure of the internal space on the inner bottom surface of the absorber rod 10. Thus the inner bottom surface of the absorber rod 10 is used as the equalizing surface 68. In order to obtain compensation of the forces acting in the vertical direction on the absorber unit 20, the surface 38 and the equalizing surface 68 are correlated with each other and adjusted in view of the dynamic pressure acting on the equalizing surface 68 and the internal pressure in the space 12. The weight of the absorber unit itself acting in the direction of the dynamic pressure is also considered in a prefered embodiment of this arrangement.

What is claimed is:
1. A drive for an absorber rod of a nuclear reactor comprising:
 a drive chamber mounted within the pressure vessel of a nuclear power plant,
 a drive piston mounted within said drive chamber for movement along its longitudinal axis,
 an absorber rod fixedly attached at one end to said drive piston and extending outside said drive chamber to a terminating surface at its other end,
 an equalizing surface fixedly attached to said drive piston, transverse to said longitudinal axis and facing the opposite direction of said terminating surface,
 means for controlled movement of said drive piston within said drive chamber independent of the medium contained within the pressure vessel, wherein both said absorber rod terminating surface and said equalizing surface are exposed to the medium contained within the pressure vessel.

2. The drive of claim 1 wherein the means for controlled movement of said drive piston is a fluid medium flowing through a first conduit into said drive chamber to effect movement of said drive piston in one direction and flowing through a second conduit into said drive chamber to effect movement of said drive in the opposite direction.

3. The drive of claim 2 wherein said drive chamber is sealed from the medium contained within the pressure vessel by sealing gaskets and means for isolation of medium leaking past said sealing gaskets.

4. The drive of claim 3 wherein said equalizing surface is attached to a member extending in the opposite direction of said absorber rod.

5. The drive of claim 4 wherein said exposed surface area of said equalizing surface equals said exposed surface area of said terminating surface.

6. A drive for an absorber rod of a nuclear reactor comprising:
   a drive chamber mounted within the pressure vessel of a nuclear power plant,
   a drive piston mounted within said drive chamber for movement along its longitudinal axis,
   a hollow absorber rod fixedly attached at one end to said drive piston and extending outside said drive chamber to a terminating surface at its other end,
   an equalizing surface fixedly attached to said drive piston, transverse to said longitudinal axis and facing the opposite direction of said terminating surface,
   means for controlled movement of said drive piston within said drive chamber independent of the medium contained within the pressure vessel,
   means for cooling said absorber rod with a cooling medium flowing within said hollow absorber rod,
   wherein said absorber rod terminating surface is exposed to the medium contained within the pressure vessel and said equalizing surface is exposed to said cooling medium.

7. The drive of claim 6 wherein the means for controlled movement of said drive piston is a fluid medium flowing through a first conduit into said drive chamber to effect movement of said drive piston in one direction and flowing through a second conduit into said drive chamber to effect movement of said drive in the opposite direction.

8. The drive of claim 7 wherein said equalizing surface is the inner surface of said hollow absorber rod.

9. A method for controlling a piston drive for an absorber rod of a high temperature nuclear reactor comprising:
   equalizing the inner driving forces contained within the reactor vessel acting on said piston drive in the axial direction, and
   applying force independent of said equalizing forces to said drive piston while maintaining the equalized inner drive forces constant.

10. The method fo claim 9 wherein said nuclear reactor is a gas cooled high temperature reactor and said equalizing step comprises directing the medium of a pressure vessel against an equalizing surface of an absorber unit and a terminating surface of an absorber rod said equalizing surface and terminating surface facing opposite directions.

11. The method of claim 9 or 10 wherein said nuclear reactor is a gas cooled high temperature reactor and said medium is the cooling medium.

12. The method of claim 11 wherein said step of applying an independent force to said piston drive comprises flowing a fluid medium through a conduit into a drive chamber housing said drive piston and sealed from said medium of the pressure vessel.

* * * * *